(12) United States Patent
Davey et al.

(10) Patent No.: US 6,397,583 B1
(45) Date of Patent: Jun. 4, 2002

(54) METHOD FOR CATALYST MONITORING USING FLEX FUEL

(75) Inventors: Christopher K. Davey, Novi; David Robert Nader, Farmington Hills; Michael Igor Kluzner, Oak Park; Paul Raymond Willette, Warren; Robert Joseph Jerger, Dexter, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/802,810

(22) Filed: Mar. 8, 2001

(51) Int. Cl.$^7$ ............................................. F01N 3/00
(52) U.S. Cl. ............................. 60/277; 60/274; 60/285
(58) Field of Search ........................... 60/274, 277, 285

(56) References Cited

U.S. PATENT DOCUMENTS

| | | | |
|---|---|---|---|
| 5,400,592 A | 3/1995 | Mukaihira et al. | 60/274 |
| 5,444,974 A * | 8/1995 | Beck et al. | 60/277 |
| 5,595,060 A * | 1/1997 | Togai et al. | 60/277 |
| 5,709,080 A * | 1/1998 | Arora et al. | 60/274 |
| 5,743,082 A * | 4/1998 | Matsumoto et al. | 60/277 |
| 5,758,494 A | 6/1998 | Davey | 60/274 |
| 5,761,901 A | 6/1998 | Staufenberg et al. | 60/274 |
| 5,894,727 A | 4/1999 | Zimlich | 60/274 |
| 5,899,062 A | 5/1999 | Jerger et al. | 60/274 |
| 5,979,160 A | 11/1999 | Yashiki et al. | 60/276 |
| 5,979,161 A * | 11/1999 | Hanafusa et al. | 60/277 |
| 5,983,629 A | 11/1999 | Sawada | 60/276 |
| 6,016,796 A | 1/2000 | Dalton | 123/695 |
| 6,018,944 A * | 2/2000 | Davey et al. | 60/285 |
| 6,073,440 A | 6/2000 | Douta et al. | 60/277 |
| 6,089,016 A | 7/2000 | Takaku | 60/277 |
| 6,112,518 A | 9/2000 | Jerger et al. | 60/274 |
| 6,235,254 B1 * | 5/2001 | Murphy et al. | 60/274 |

* cited by examiner

Primary Examiner—Thomas Denion
Assistant Examiner—Diem Tran

(57) ABSTRACT

Method and system are provided for monitoring performance of a catalytic converter coupled to an exhaust of an internal combustion engine supplied with fuel from a fuel tank where the fuel can include a first fuel and second fuel in concentrations that vary from one refueling to the next. A ratio indicative of catalytic converter exhaust gas conversion efficiency is determined from signals provided by an exhaust gas sensor disposed upstream and an exhaust gas sensor disposed downstream relative to the catalytic converter, and a ratio threshold value indicative of a malfunctioning catalytic converter is adjusted in dependence on the concentration of one of the first fuel and second fuel in the fuel in the fuel tank.

11 Claims, 4 Drawing Sheets

METHOD FOR CATALYST MONITORING USING FLEX FUEL

BACKGROUND OF THE INVENTION

1. Field of the Invention

The present invention relates to a method and control system for monitoring exhaust gas conversion efficiency of a catalytic converter communicated to an internal combustion engine which is supplied with a so-call flex fuel which may include first and second fuels present in different concentrations from one refueling to the next.

2. Description of Related Art

U.S. Pat. No. 5,899,062 describes a method and control system for monitoring the efficiency of a catalytic converter communicated to the exhaust manifold of the internal combustion engine. A controller processes signals from pre-catalyst oxygen sensor (HEGO sensor) positioned upstream of the catalytic converter and a post-catalyst oxygen sensor (catalyst monitor sensor known as CMS) positioned downstream of the catalytic converter and determines a ratio which is based on an instantaneous incremental arc length, and/or accumulated series of incremental arc lengths, of the downstream sensor signal divided by the instantaneous incremental arc length, and/or accumulated series of incremental arc lengths, of the upstream sensor signal. The ratio is indicative of the efficiency of the catalytic converter and is compared with subsequently generated ratios to monitor converter efficiency over time. When the ratio exceeds a ratio threshold value, the catalytic converter is deemed to malfunction, and a malfunction indicator light (MIL) is illuminated to alert the vehicle operator.

In practicing the method and control system of the above patent, the arc lengths and corresponding ratio are calculated when predetermined global and local entry conditions are met so as to reduce unwanted variations in the calculation due to factors that are unrelated to catalyst conversion efficiency.

Currently, internal combustion engines of motor vehicles are being adapted to operate on so-called flexible fuels that include gasoline and various percentage blends of gasoline and ethanol because of possible reduction in certain regulated emissions. As a result, there is a need for a method and control system for monitoring the efficiency of a catalytic converter when the internal combustion engine will be operated on such flexible fuels where the concentration of gasoline in the fuel supplied to the engine from the fuel tank may vary from about 90% by volume to as low as about 15% by volume in gasoline/ethanol blended fuel and where the concentration of gasoline in the fuel in the fuel tank may vary from one tank refueling to the next as the motor vehicle is operated.

An object of the present invention is to provide a method and control system for monitoring the exhaust gas conversion efficiency of a catalytic converter that satisfies this need.

SUMMARY OF THE INVENTION

The present invention provides pursuant to one embodiment a method and control system for monitoring the performance of a catalytic converter where a ratio indicative of catalytic converter exhaust gas conversion efficiency is determined from upstream and downstream exhaust gas sensor signals and compared to a ratio threshold value (e.g. an index ratio threshold value) that is indicative of a malfunctioning catalytic converter and that is adaptively adjusted in dependence on a fuel blending ratio that reflects the current concentration of at least one of a first fuel and second fuel, such as for example gasoline and ethanol, in the fuel tank. The comparison is used as an indication of whether or not the catalytic converter is malfunctioning.

The present invention is advantageous to adjust the ratio threshold value in dependence on the fuel composition in the fuel in the fuel tank in a manner to provide more accurate monitoring of the catalytic converter under variable fuel blending ratio conditions. Adjustment of the ratio threshold value pursuant to the invention will avoid false activation of a malfunction indicator light (MIL) that otherwise might occur as a result of the effect of a particular fuel blending ratio on signal characteristics of the downstream exhaust gas sensor (e.g. a downstream catalyst monitor sensor).

The above objects and advantages of the present invention will become more readily apparent from the following description taken with the following drawings.

DETAILED DESCRIPTION OF THE PREFERRED EMBODIMENT

Figure 1:
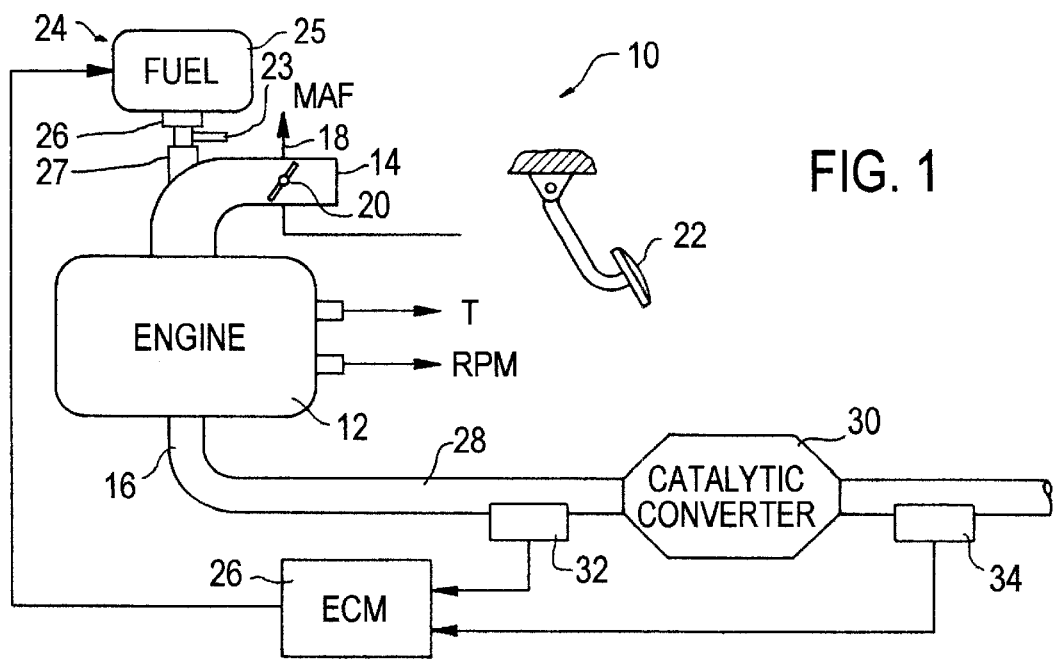
FIG. 1 is a block diagram of components for practicing an embodiment of the present invention.

Referring to FIG. 1, a block diagram illustrating one embodiment of a system 10 for monitoring performance or conversion efficiency of a catalytic converter is shown. System 10 includes an in-line internal combustion engine 12 having a single bank of cylinders (not shown) communicating to a single intake manifold 14 and single exhaust manifold 16. Airflow through intake manifold 14 is measured by mass air flow (MAF) sensor 18 and regulated by throttle valve 20. A throttle position sensor provides a signal indicative of position of throttle valve 20 or an associated accelerator pedal 22. A conventional fuel supply 24 includes a fuel tank 25 and fuel pump 26 to provide fuel to fuel injectors 27 (one schematically shown) which is mixed with the air in the intake manifold 14 to provide a combustion mixture which is controlled by an engine controller, such as Engine Control Module (ECM) 26. Of course, ECM 26 may perform control and monitoring functions for various vehicle system and subsystems in addition to controlling and monitoring engine 12.

An exhaust pipe 28 couples catalytic converter 30, preferably a three-way converter, to the exhaust stream of engine 12. Catalytic converter 30 is monitored via an upstream exhaust gas sensor 32 and a downstream exhaust gas sensor 34 in communication with the engine controller 26. Upstream sensor 32 is interposed between engine 12 and catalytic converter 30, whereas downstream sensor 34 is interposed between catalytic converter 30 and atmosphere. Upstream (front) sensor 32 is preferably a heated exhaust gas oxygen sensor, commonly referred to as a HEGO sensor, which provides an indication of the presence or absence of oxygen in the exhaust stream. Downstream (rear) sensor 34 operates in a similar manner as upstream sensor 32 but is commonly referred to as a catalyst monitor sensor (CMS) due to its intended function in the exhaust system. Any number of exhaust gas sensors may be used including lamda sensors, proportional oxygen sensors, and the like to determine conversion efficiency of the catalyst pursuant to the present invention.

ECM 26 includes a microprocessor and various computer readable storage media, which may include, but are not limited to, a read only memory (ROM), a random access memory (RAM), and a keep-alive memory (KAM). The computer readable storage medium may be implemented by any of a number of known volatile and nonvolatile storage devices including, but not limited to, PROM, EPROM, EEPROM, flash memory, and the like, all of which are well known in the art. RAM is typically used for temporary data storage of various operating variables which are lost when the engine ignition is turned off, such as counters, timers, status flags, and the like. KAM is generally used to store learned or adaptive values which may change over time. The contents of KAM are maintained as long as some power is provided to ECM 26. Preferably, one or more ROM's within ECM 26 contains control logic implemented by software program instructions executed by the microprocessor along with various system parameter values and calibrations.

ECM 26 receives signals from upstream and downstream exhaust sensors 32, 34, respectively, which reflect current operating conditions of engine 12 and catalytic converter 30. For example, when at or above operating temperature, HEGO sensor provides a continuous signal (preferably a voltage) to ECM 26 based on the presence or absence of oxygen in the exhaust pipe 28. The voltage signal is indicative of the excursion from the stoichiometric combustion mixture of the exhaust gases in exhaust manifold 16. Preferably, the HEGO sensor signals are two-state having a predetermined high voltage when exhaust gases indicate a rich mixture and a predetermined low voltage when exhaust gases indicate a lean mixture. CMS 34 monitors catalytic converter 30 by detecting the presence or absence of oxygen downstream of converter 30 and provides a voltage signal to ECM 26.

Various other sensors communicate with ECM 26 to facilitate control and monitoring functions. Sensors may include an engine coolant temperature sensor T, engine speed sensor (RPM), and the like.

ECM 26 uses control logic implemented in hardware and/or software to generate various signals to control and monitor operation of the engine 12. For example, ECM 26 generates an output signal to electronic fuel injectors, represented by fuel supply 24, to control the quantity and timing of fuel delivered to engine 12. ECM 26 is also used to monitor performance of catalytic converter 30 using HEGO sensor 32 and CMS 34. The sensor signals are filtered, periodically sampled, and stored within ECM 26 to monitor performance of catalytic converter 30 as described below.

In particular, ECM 26 samples, processes and stores in KAM signals (e.g. signal arc length values) from HEGO sensor 32 and CMS 34 to determine incremental arc lengths of the signals from sensors 32, 34. The ECM 26 determines an instantaneous ratio of the incremental arc length of downstream CMS 34 divided by arc length of upstream HEGO sensor 32. The instantaneous ratio may be based on single sample period or a number of sample periods occurring during a predefined event, such as a completed monitor cycle or trip. The instantaneous arc lengths for each sensor signal are summed or accumulated by ECM 26 over time. The ECM 26 then determines a ratio of the accumulated or summed incremental arc lengths of CMS sensor signals divided by the accumulated or summed incremental arc lengths of HEGO sensor signals. The ratio which is based on the accumulated or summed incremental arc lengths of the CMS sensor signals divided by the accumulated incremental arc lengths of the HEGO sensor signals over time is referred to hereafter as "index ratio". The index ratio is indicative of the efficiency of the catalytic converter and is compared with subsequently generated index ratios to monitor catalytic converter efficiency over time. Calculation and storing of index ratios are described in detail in U.S. Pat. No. 5,899,062 and U.S. Pat. No. 6,112,518, the teachings of both of which are incorporated herein by reference to this end. When the index ratio exceeds a calibrated index ratio threshold value indicative of a malfunctioning catalytic converter, a malfunction indicator light (MIL) is illuminated to alert the vehicle operator. The calibrated index ratio threshold value is a value which detects or corresponds to a Federal or California regulation-mandated requirement of a failed $HC/NO_x$ emission level, thus being indicative of a malfunctioning catalytic converter.

Figure 3:
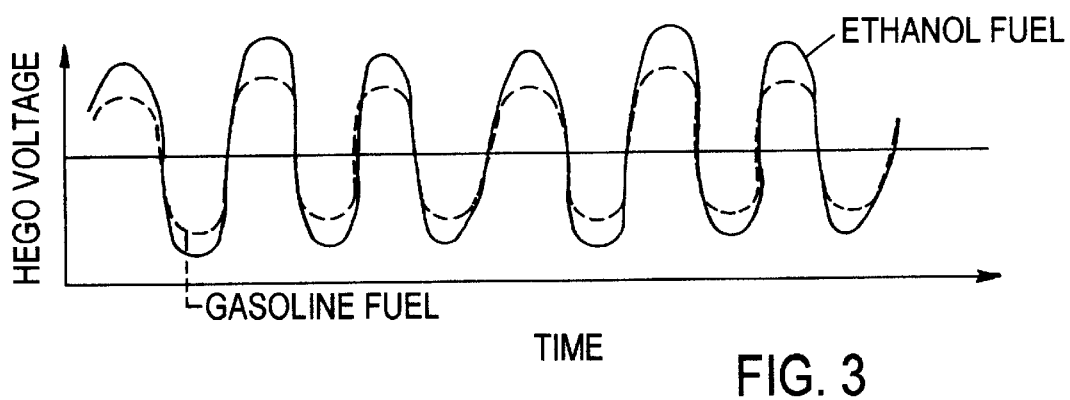
FIG. 3 is a graph of representative signals from downstream catalytic monitor sensor showing the affect on the signal of increasing ethanol concentration in the fuel.

In accordance with an embodiment of the present invention, system 10 recognizes that the signal provided by CMS 34 varies in dependence on the concentration of ethanol (as a second fuel) in the gasoline (as a first fuel) in the fuel tank 25. In particular, the system recognizes that the peak to peak amplitude activity of the CMS signal increases as the ethanol concentration in the gasoline-based fuel in tank 25 increases. FIG. 3 illustrates an exemplary change in CMS sensor signal with an increase in ethanol in the fuel.

This affect of ethanol concentration on the CMS sensor signal in turn affects a change in the above-described index ratio such that the index ratio increase with increasing ethanol concentration in the fuel in tank 25.

Figure 2:
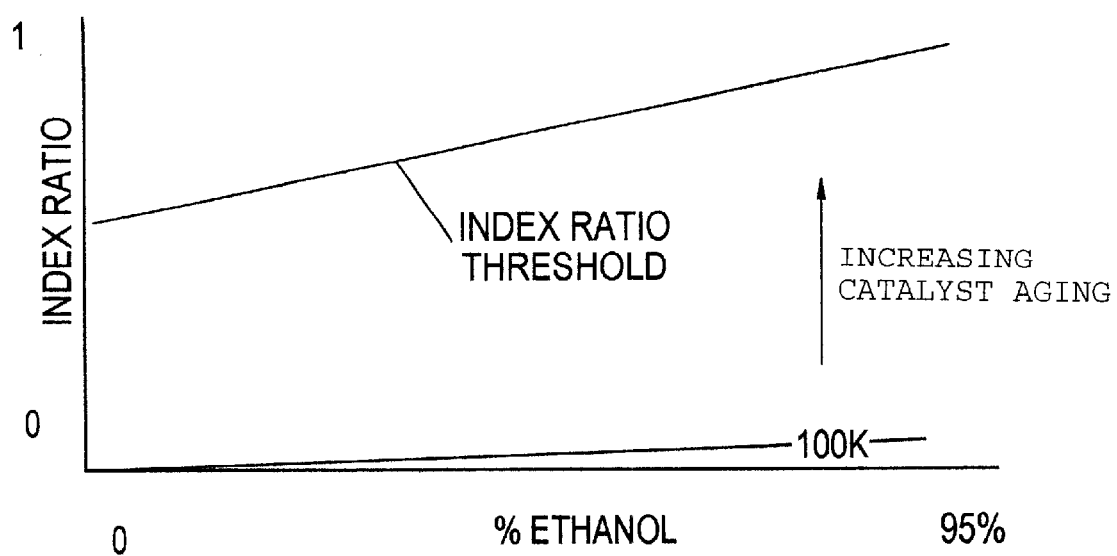
FIG. 2 is a graph that shows a linear relationship of the index ratio threshold value versus the percentage ethanol in the fuel generated from an emission threshold failed catalyst. Also shown is graph ("100K") of index ratio versus percentage ethanol generated from a 100K dynamometer aged catalyst that is equivalent to a 100,000 mile vehicle driven catalyst.

FIG. 2 illustrates a linear relationship of the index ratio threshold versus the percentage ethanol in the fuel generated from an emission threshold catalyst (oven aged at 1300 degrees C for 8 hours in air) that fails emission requirements of Federal or California regulations. FIG. 2 also includes a graph labeled "100K" showing a relationship of index ratio versus the percentage ethanol generated from a 100K dynamometer-aged catalytic converter, which is equivalent to a 100,000 mile vehicle-driven catalyst. It is apparent that the index ratio threshold increases linearly with % ethanol in the gasoline fuel. Also, over time as the catalyst degrades, the index ratio will increase toward the index ratio threshold as indicated by the upwardly pointing arrow from the graph labeled "100K" in FIG. 2.

The present invention provides for the adaptive adjustment of the calibrated index ratio threshold value in dependence on a fuel blending ratio that reflects the current concentration of ethanol (or other alcohol) in the fuel in the fuel tank 25. For example, referring again to FIG. 2, the dependence of the index ratio threshold value on the concentration of ethanol in a gasoline-based fuel is shown. The linear relationship of the index ratio threshold value (cat_thr) uses percent ethanol (PM) as an input and is represented as follows:

$$\text{cat\_thr} = ((\text{slope\_tmp} * \text{PM}) + (\text{CAT\_FLX\_RAT} - (\text{slope\_tmp} * \text{CAT\_PM\_ETH}))) \quad (1)$$

where slope_tmp=(CAT_FLX_RAT-CAT_FL_RAT)/(CAT_PM_ETH-CAT_PM_GAS) and CAT_FL_RAT is the calibrated index ratio threshold value that will illuminate the MIL for 100% gasoline fuel,
CAT_FLX_RAT is the calibrated index ratio threshold value that will illuminate the MIL for ethanol blended fuel, CAT_PM_ETH is the calibrated percent ethanol value that was used to set the calibration value of the above index ratio threshold value using ethanol blended fuel only, and
CAT_PM_GAS is the calibrated percent ethanol value that was used to set the calibration value of the above index ratio threshold value using gasoline fuel only.

These equations are stored in the KAM of ECM 26 as fuel adaptive algorithms to enable ECM 26 to calculate an adjusted emission threshold ratio in dependence on the concentration of ethanol in the fuel in tank 25. A calibration constant (CAT_PM_LVL), that is stored in KAM, has a value set to a percentage of ethanol. When the percentage of ethanol after a refueling event is greater than CAT_PM_LVL, then the on-going catalyst monitor test is aborted and reset with a new index ratio threshold for the new fuel blending ratio.

The ethanol concentration in the fuel can be measured by a conventional fuel ethanol sensor 23 and/or inferred as a fuel blending ratio by EMC 26 from an air/fuel error during an interval of time in response to a refueling indication in the manner taught in U.S. Pat. No. 6,016,796, the teachings of which are incorporated herein by reference. The air/fuel error is determined from signals provided by HEGO sensor 32 to EMC 26 indicating that the exhaust gases are either rich of a desired fuel/air ratio or lean of the desired fuel/air ratio as explained in the patent. The refueling indication comprises a change of level of fuel in the tank 25 detected by a conventional fuel level sensor on the fuel tank or other detection schemes described in the patent. A fuel blending ratio algorithm pursuant to U.S. Pat. No. 6,016,976 is stored in the KAM of ECM 26 to enable ECM 26 to calculate an inferred fuel blending ratio for use in practice of the invention.

Pursuant to an embodiment of the invention, ECM 26 monitors the conversion efficiency of catalytic converter 30 by determining index ratio (IR) from HEGO sensor signals and CMS sensor signals using stored algorithms pursuant to U.S. Pat. No. 5,899,062, by inferring a fuel blending ratio using algorithms pursuant to U.S. Pat. No. 6,016,796, and by comparing the determined index ratio to a threshold ratio value (e.g. emission threshold value of FIG. 2) that is adaptively adjusted using the algorithms (equations) set forth above in dependence on the inferred fuel blending ratio that reflects the current concentration of ethanol in the fuel in the fuel tank. When the determined index ratio exceeds the adaptively adjusted emission threshold ratio value, the catalytic converter 30 is deemed to malfunction, and a malfunction indicator light (MIL) is illuminated to alert the vehicle operator.

ECM 26 executes a catalytic converter monitoring routine or cycle as necessary to monitor the conversion efficiency of catalytic converter 30. The monitoring routine is run only after initial global and entry conditions are checked and determined to be within acceptable ranges for each condition stored in KAM U.S. Pat. No. 6,112,528 incorporated herein by reference describes conduct of a monitoring cycle only when entry conditions are met. Global entry conditions that must satisfied (within a calibrated range) include, but are not limited to, engine coolant temperature, air charge temperature, temperature of CMS 34, and timers that optimize monitoring based on vehicle operating condition (e.g. cold start, hot start, etc.). Local entry conditions that must satisfied (within a calibrated range) include, but are not limited to, engine rpm/load, engine throttle rate and position, EGR rate, vehicle speed, fuel level in fuel tank, catalyst mid-bed temperature, and timers that optimize monitoring based on vehicle operating condition (e.g. cold start, hot start, etc.). Also, the KAM must provide a flag indicating that a PM (percent ethanol) value of high confidence has been stored therein and that it is within a preset range of values. If the PM value has changed or changes by a calibrated amount between or during catalyst monitor testing, this will cause a reset of the catalyst monitoring values.

Once these entry conditions are met or satisfied, then the ECM 26 executes the catalytic converter monitoring routine. Typically, the ECM 26 periodically (e.g. once every vehicle drive cycle) executes the catalytic converter monitoring routine in response to control logic which may be implemented in hardware, software or both. The control logic preferably is stored in the aforementioned computable readable medium, such as a PROM, EPROM, EEPROM, or flash memory, and represents program instructions which may be executed by a microprocessor. Of course other implementations of the control logic using discrete components and/or custom integrated circuits, such as ASIC's, are possible without departing form the scope of the invention.

Figure 4:
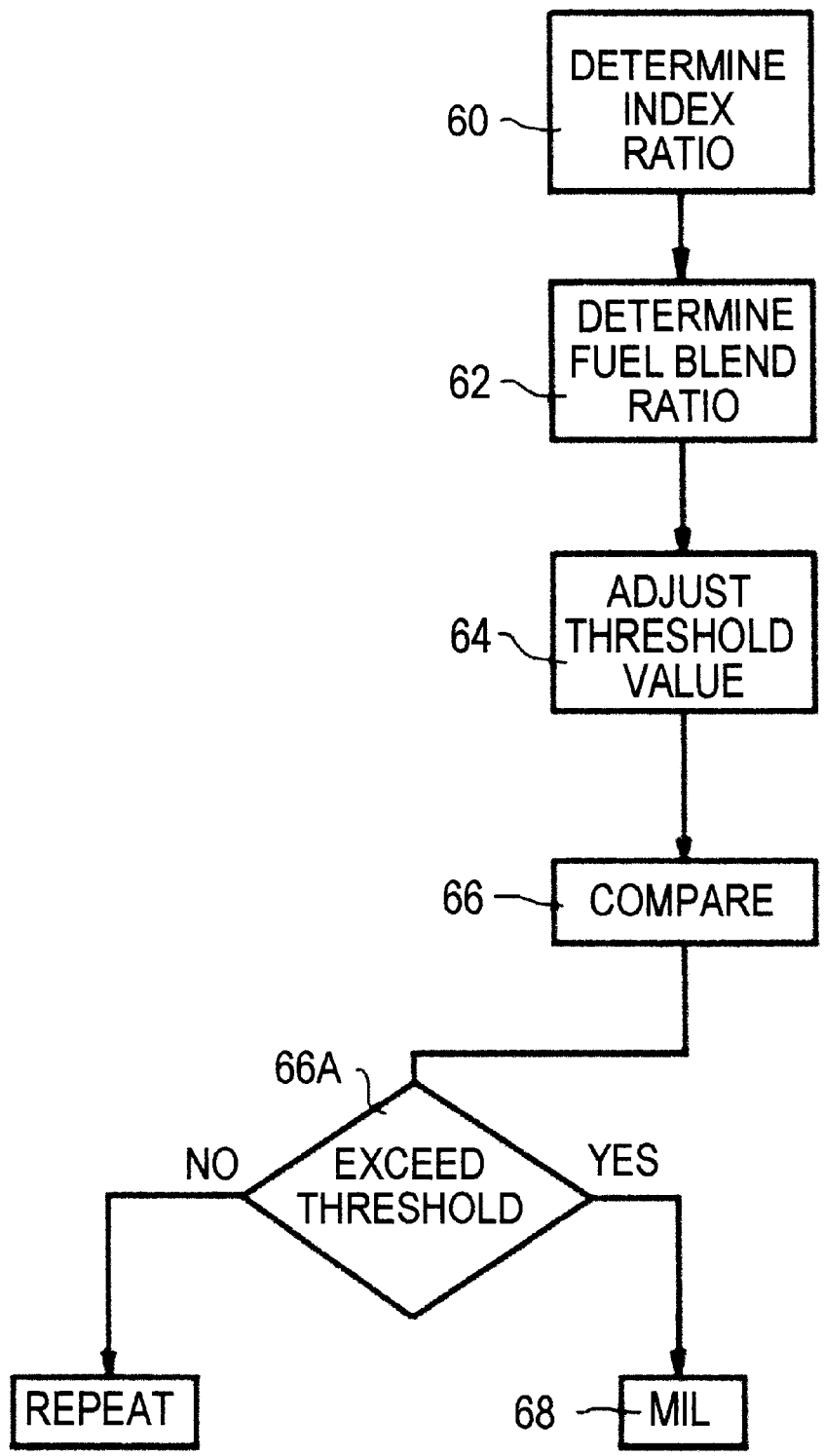
FIG. 4 is flow diagram illustrating operation of a system or method according to an embodiment of the invention.

FIG. 4 is a flow diagram illustrating operation of catalytic converter monitoring control logic pursuant to an exemplary embodiment of the invention offered for purposes of illustration and not limitation, since other sequences in operation of the routine are within the scope of the invention.

Flow diagram begins with block 60 which represents determination of an index ratio (IR) from HEGO sensor signals and CMS sensor signals pursuant to U.S. Pat. No. 5,899,062. Block 62 represents a step where a fuel blending ratio is inferred pursuant to U.S. Pat. No. 6,016,796 or measured using sensor 23. Block 64 represents adaptive adjustment of the index ratio threshold value in dependence on the inferred fuel blending ratio pursuant to the invention. Block 66 represents a comparing step where the determined index ratio is compared to the adaptively adjusted index ratio threshold value that reflects the current concentration of ethanol in the fuel in the fuel tank. Block 68 represents illumination of malfunction indicator light (MIL) to alert the vehicle operator when the determined index ratio exceeds the adaptively adjusted emission threshold ratio value as indicated in Block 66a. When the determined index ratio does not exceed the adaptively adjusted index ratio threshold value in block 66a, the control logic repeats the routine on the next engine drive or power up.

The invention has been described in detail hereabove with respect to a system 10 for monitoring performance of catalytic converter 30 communicated to a single bank of cylinders of the internal combustion engine. If a V-block internal combustion engine is employed having separate banks of engine cylinders and associated separate exhaust manifolds 16, the invention envisions providing a separate exhaust pipe 28, catalytic converter 30, and sensors 32, 34 for each bank of cylinders with each catalytic converter being monitored as described above. Equation (1) above would be used for each catalytic converter 30 to adjust the index ratio threshold value in dependence on the fuel blending ratio.

Figure 1A:
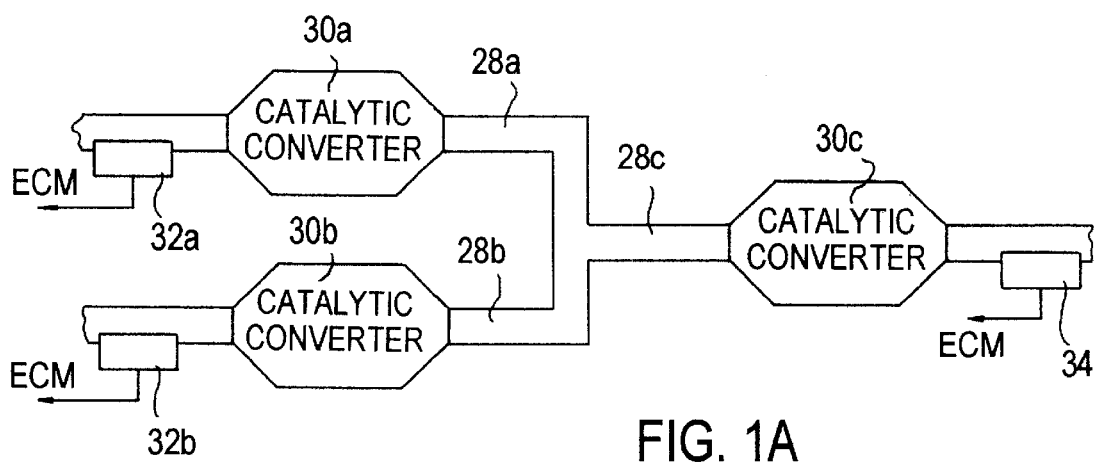
FIG. 1A is a block diagram of components for practicing another embodiment of the present invention.

Referring to FIG. 1A, a block diagram is provided illustrating an alternative embodiment for monitoring performance or conversion efficiency of a catalytic converter system that includes a Y-pipe configuration having exhaust pipes 28a, 28b for a respective engine cylinder bank. Each pipe 28a, 28b includes a catalytic converter 30a, 30b and a respective upstream (front) HEGO sensor 32a, 32b in each pipe 28a, 28b. A downstream exhaust pipe 28c includes a catalytic converter 30c and a downstream (rear) CMS sensor 34. Such a system is shown in U.S. Pat. No. 5,894,727, the teachings of which are incorporated herein by reference.

The present invention can be practiced for the system illustrated in FIG. 1A to monitor the conversion efficiency of the catalytic converters 30a, 30b, 30c. In practicing the invention for the system of FIG. 1A, a further entry condition is provided in addition to those global and local entry conditions described above. In particular, before the ECM 26 executes the catalytic converter monitoring routine, the signals from the HEGO sensors 32a, 32b must be in an additive phase condition; i.e. where the signals are additive to a certain preset extent, as opposed to a subtractive phase condition where the signals tend to interfere with or cancel out one another. When this entry condition is met, the catalyst monitoring routine is executed in accordance with the flow diagram of FIG. 4 as described above where in step 60 the index ratio is determined based on the collective additive signals from the HEGO sensors 32a, 32b. The monitoring routine then proceeds with steps 62, 64, 66, 66A and 68 as described above. The malfunction indicator light (MIL) will be illuminated in step 68 when the index ratio determined from the collective additive HEGO signals exceeds the adjusted index ratio threshold value.

The present invention is advantageous to adjust the emission threshold ratio value in dependence on the alcohol concentration in the fuel in the fuel tank in a manner that provides more accurate monitoring of the catalytic converter under variable fuel blending ratio conditions. Adjustment of the threshold ratio value pursuant to the invention will avoid false activation of a malfunction indicator light (MIL) that otherwise might occur as a result of the effect of a particular fuel blend ratio on signal characteristics of a catalyst monitor sensor (CMS). The invention can be practiced when the internal combustion engine will be supplied with a fuel comprising a first fuel and second fuel in different concentrations from one refueling of the fuel tank to the next.

While the invention has been described in terms of specific embodiments, those skilled in the art will appreciate that various modified and alternative embodiments for practicing the invention are possible as defined in the following claims.

What is claimed is:

1. A method of monitoring performance of a catalytic converter coupled to an exhaust of an internal combustion engine supplied with fuel from a fuel tank where the fuel can include a first fuel and second fuel in concentrations that vary from one refueling to the next, comprising
    a) determining a ratio indicative of catalytic converter exhaust gas conversion efficiency from signals provided by an exhaust gas sensor disposed upstream and an exhaust gas sensor disposed downstream relative to the catalytic converter, and
    b) adjusting a ratio threshold value indicative of a malfunctioning catalytic converter in dependence on the concentration of one of the first fuel and second fuel in the fuel in the fuel tank.

2. The method of claim 1 wherein the first fuel comprises gasoline and the second fuel comprises ethanol.

3. The method of claim 1 wherein said ratio threshold value is adaptively adjusted based on a fuel blending ratio indicative of relative concentrations of said first fuel and said second fuel in the fuel in the tank.

4. A method of monitoring performance of a catalytic converter coupled to an exhaust of an internal combustion engine supplied with fuel from a fuel tank where the fuel can include a first fuel and second fuel in concentrations that vary from one refueling to the next, comprising
    a) determining a ratio indicative of catalytic converter exhaust gas conversion efficiency from signals provided by an exhaust gas sensor disposed upstream and an exhaust gas sensor disposed downstream relative to the catalytic converter,
    b) determining a fuel blending ratio indicative of relative concentrations of said first fuel and said second fuel in the fuel in the tank,
    c) adaptively adjusting a ratio threshold value indicative of a malfunctioning catalytic converter in dependence on the fuel blending ratio, and
    d) comparing the ratio of step a) to the adaptively adjusted ratio threshold value of step c).

5. The method of claim 4 including the further step of illuminating a malfunction indicator light when the ratio of step a) exceeds the adaptively adjusted ratio threshold value of step c).

6. The method of claim 4 repeating steps a) through d) in response to a refueling indication.

7. System for monitoring a catalytic converter coupled to an exhaust of an internal combustion engine supplied with fuel from a fuel tank where the fuel can include a first fuel and second fuel in concentrations that vary from one refueling to the next, comprising:
    a) an exhaust gas sensor disposed upstream and an exhaust gas sensor disposed downstream relative to the catalytic converter, and
    b) control logic in communication with said upstream exhaust gas sensor and said downstream exhaust gas sensor for determining a ratio indicative of catalytic converter exhaust gas conversion efficiency from signals provided by said exhaust gas sensor disposed upstream and said exhaust gas sensor disposed downstream relative to the catalytic converter, and
    c) control logic for adjusting a ratio threshold value indicative of a malfunctioning catalytic converter in dependence on the concentration of one of the first fuel and second fuel in the fuel in the fuel tank to provide an adjusted ratio threshold value.

8. The system of claim 7 including control logic for inferring a fuel blending ratio indicative of relative concentrations of said first fuel and said second fuel in the fuel in the tank.

9. The system of claim 7 including a sensor for measuring a fuel blending ratio indicative of relative concentrations of said first fuel and said second fuel in the fuel in the tank.

10. The system of claim 7 including control logic for comparing said ratio to said adjusted ratio threshold value.

11. The system of claim 10 including control logic for illuminating a malfunction indicator light when said ratio exceeds said adjusted ratio threshold value.

* * * * *